No. 677,319. Patented June 25, 1901.
E. McCONVILLE.
VEHICLE WHEEL.
(Application filed Jan. 15, 1901.)
(No Model.) 2 Sheets—Sheet 1.
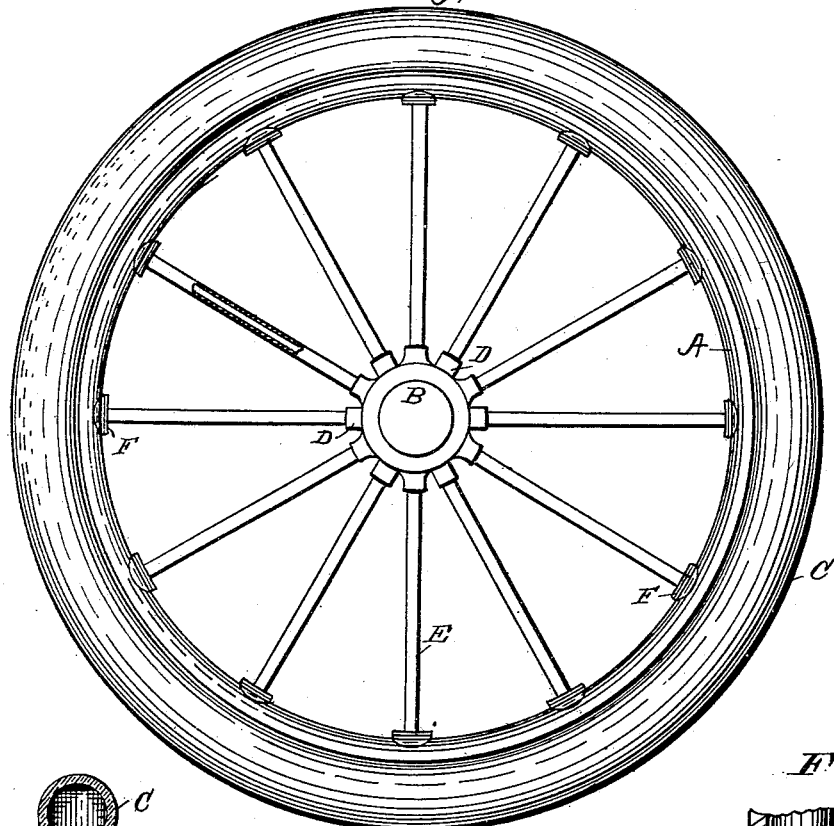
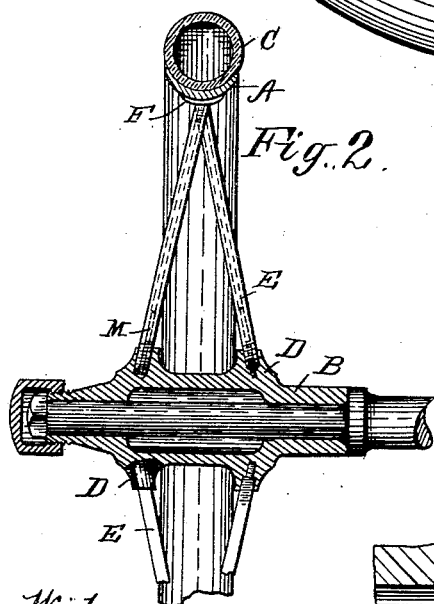
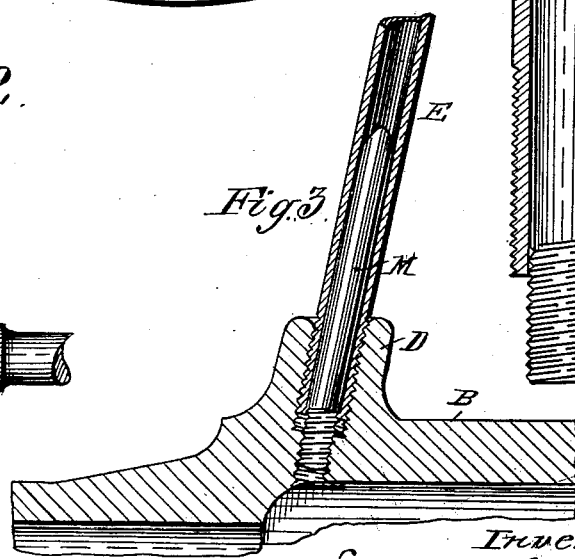
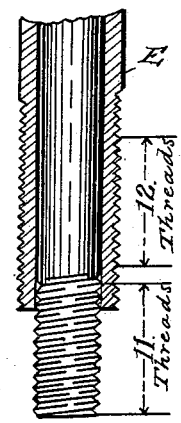
Inventor
Emmett McConville
by W. Riss Edelen
his atty.

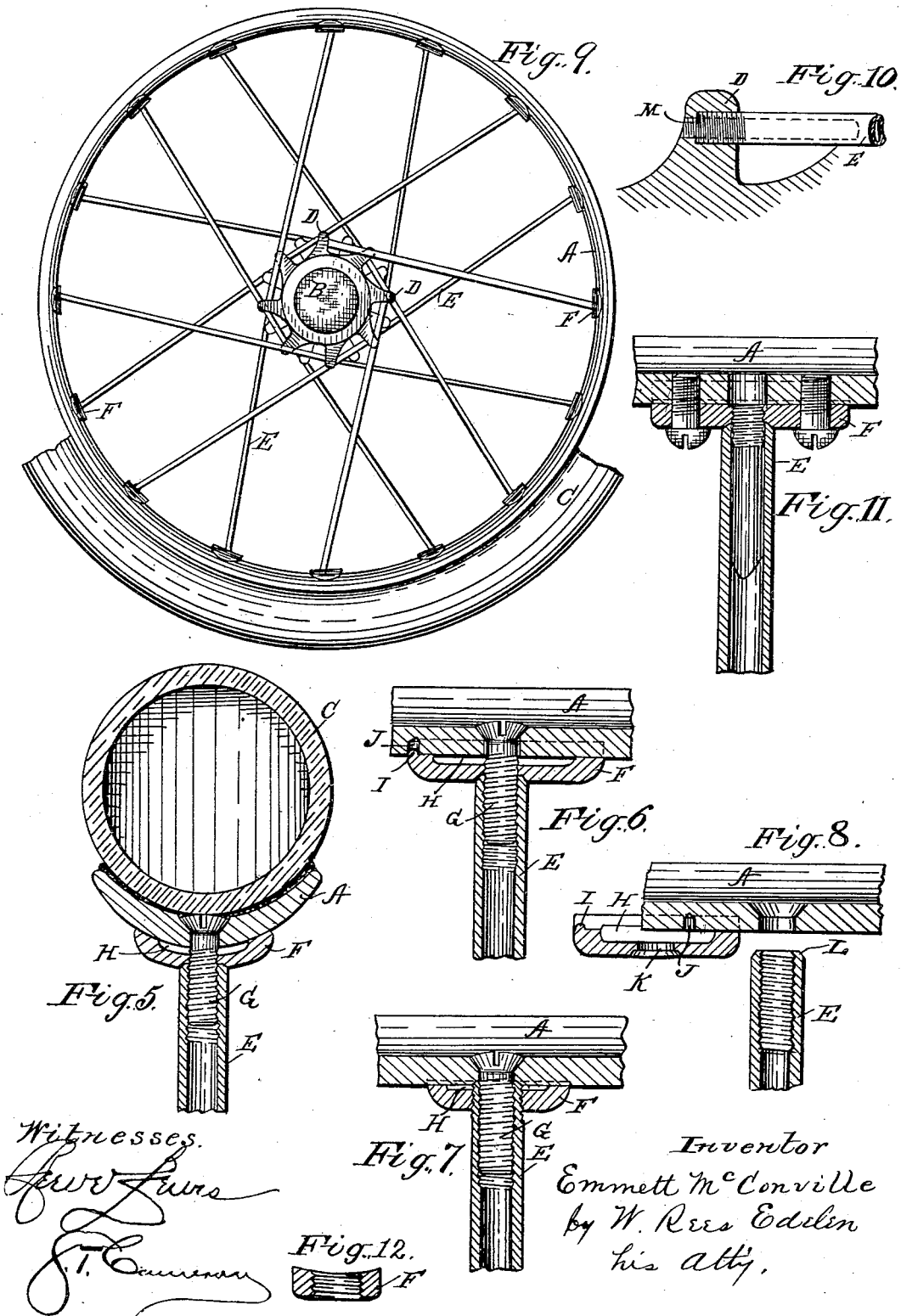

UNITED STATES PATENT OFFICE.

EMMETT McCONVILLE, OF PITTSBURG, PENNSYLVANIA.

VEHICLE-WHEEL.

SPECIFICATION forming part of Letters Patent No. 677,319, dated June 25, 1901.

Application filed January 15, 1901. Serial No. 43,320. (No model.)

*To all whom it may concern:*

Be it known that I, EMMETT MCCONVILLE, a citizen of the United States, residing at Pittsburg, in the county of Allegheny and State of Pennsylvania, have invented certain new and useful Improvements in Vehicle-Wheels; and I do hereby declare the following to be a full, clear, and exact description of the invention, such as will enable others skilled in the art to which it appertains to make and use the same.

This invention has reference to improvements in metallic wheels for automobiles and other vehicles, and which consists of certain novel features of construction, which will be hereinafter described in the specification, in conjunction with the drawings, and clearly pointed out in the claims.

One object of the present invention is to provide substantial, practical, and symmetrical wheels for vehicles and also for automobiles at a minimum cost and of unique proportions.

The present invention consists of hollow or tubular spokes which are firmly secured in their hub, and the opposite ends of the spokes are drawn tightly toward and held in tension through the medium of the wheel-rim, thus constituting a tension-spoke wheel in contradistinction to an ordinary-spoke wheel, where the load on the vehicle acts to compress the spokes. By the construction of the present device a much lighter spoke can be employed in tension than in compression.

A further object of the invention is to so construct the wheel that the tubular spokes can be secured into their hub and not be liable to become loosened by constant or rough usage.

A further object of the invention is to so construct the rim end of the spokes that they will be a fraction of an inch shorter radially than the distance between the hub and the rim thereof and to interpose a washer having a concave surface corresponding to the convexity of the rim and between the rim ends of the spokes and the rim and draw the spokes securely and firmly to the rim by means of securing-screws passing through the rim and engaging the tubing.

A further object of the invention is to reinforce the tubing by securing plugs or rods a few inches in the ends thereof. At the hub end of the tubing the plugs project somewhat and are screw-threaded—say eleven threads to the inch—while the end of the tubing is also screw-threaded on the outside with twelve threads to the inch. By such construction a differential screw is produced which will draw the spokes securely into the hub and act similar to a lock-nut, thus preventing the spokes from rattling.

A further object of the invention is to so construct the washers that there will be a recess between their upper surface and adjacent to the convex surface of the rim, so as to allow of a slight resilience of the washer when secured to the rim. By this means the screws which secure the spokes to the rim through the medium of the washers will be held tight and be prevented from turning.

A further object in reference to the washers is to provide a nib or teat at one end of each washer, so as to mesh into a hole in the rim, for the purpose of preventing longitudinal movement of the washer or spokes. Also when the washers are extremely flat the teat will prevent them from turning around the securing-bolts.

In the accompanying drawings, which form part of this specification, Figure 1 represents a side elevation of the improved wheel, which is provided with radial tubular spokes. Fig. 2 represents a section in detail of the improved wheel. Fig. 3 represents a detail in section exhibiting the method of securing the spokes by means of a differential screw. Fig. 4 represents, on an exaggerated scale, the construction of the spoke with a differential screw thereon. Fig. 5 represents a transverse section of the rim and washer, indicating the means for securing the spokes to the rim. Fig. 6 represents a portion of the rim, taken longitudinally, and the means for holding the washers in place. Fig. 7 is similar in construction to the view shown in Fig. 6, with the exception of the washer, which is screw-threaded for engaging the end of the spoke. Fig. 8 represents a detail in section of a portion of the rim and its accompanying parts preparatory to assembling the same. Fig. 9 represents in side elevation a wheel with tangent spokes therein and which are composed of tubing. Fig. 10 represents in detail one of the projections enlarged and the means for securing one of the tangential spokes therein. Fig. 11 represents a portion of the rim and the washer, both in section, and a plug secured in the tubular spoke, having a screw-thread thereon for engaging the washer, the washer being secured to the rim by two screws. Fig. 12 is a detail in section of the washer indicated in Fig. 7 and having a flat concave upper surface.

In the drawings, A indicates the rim of the wheel, which is provided with a hub B and flexible tire C. The hub B is preferably made integral and is provided with radial extensions D, which are staggered and spread a considerable distance apart at the hub end, as indicated at Fig. 2, so as to give stability to the wheel and also to protect the wheel against lateral stress.

The spokes E are tubular in cross-section and are in alinement with each other on the rim A and have interposed between the ends of the spokes and the rim A washers F, which are oblong or elliptical in outline. The washers envelop a portion of the rim on opposite sides of the securing screws or bolts G. (See Fig. 5.) The washers are preferably chambered, as at H, so as to be somewhat resilient, so as to prevent the screw G from becoming disengaged, as the slight spring of the washer will have an elastic bearing on the screw-threads of said belts or screws G. On one end of each washer is a nib or teat I for engagement with holes J in the rim, which is to prevent longitudinal movement of the washers, also to prevent the washers from turning out of their longitudinal position, and also to protect the securing-screws G from sudden shocks and wear. Each washer is drilled and countersunk at K, so as to receive the chamfered end L of the spokes.

The tubular spokes are screw-threaded internally, so that the screws G will draw them toward the rim, and consequently hold the spokes in tension.

In Fig. 7 the ends of the spokes are screw-threaded externally for engaging a screw-threaded hole in the washer. By this construction the wheel can be adjusted to a nicety by slightly adjusting the washer against the rim of the wheel and then drawing the spokes tightly in tension by means of the screws G.

In Fig. 11 a plug with a screw-threaded end is secured into the tubular spokes, and the screw-threaded end is secured into the washer, thus bringing the chamfered end of the spokes tightly against said washers. The washers are secured by screws entering the internal periphery of the rim, thus making a very strong device.

The hub end of the tubular spokes are reinforced by long plugs M, secured therein and having a portion projecting from the tubular spokes which is screw-threaded. The ends of the tubular spokes are also screw-threaded externally with twelve threads to the inch, while the plug M has only eleven threads to the inch. By this means a differential screw is produced. (See Figs. 3 and 4.) It will be observed that the end of the tubular spokes E are chased over twice the distance that the end of the plug M is chased or threaded, the object of which is to secure a long bearing in the hub B before the end M of the plug enters the hub, as the screw on the plug M will draw into the spoke faster or quicker than the threaded portion of the hollow spoke by the difference of one thread. This increment of the thread does not begin to wedge the screw on the tube until about half an inch of the thread on the plug M has been drawn into the hub, when both threads begin to tighten on their upper angular surfaces of their respective threads, thus producing a joint almost equivalent to a rigid connection.

The tubular spokes can be applied to any kind of a wheel, either radial or tangential spoked wheel, and can be secured at their opposite ends in a similar manner.

When assembling this improved wheel, the spokes are secured into the hub, when they are trimmed off and chamfered the proper length and will assume the position relatively as indicated in Fig. 8 of the accompanying drawings, where the washer is in a position to engage the spoke and the rim of the wheel. As the washers are forced over the spokes the rim will spring sufficiently to allow the washer to envelop the end of the spoke, and at the same time the nib I will enter the hole or recess J in the rim, as indicated in Fig. 6, thus not only making a rigid wheel, but one that will yield in extreme cases of hard usage, as the spokes can spring slightly without in any manner injuring the parts of the wheel.

Having described my invention, that which I desire to secure by Letters Patent of the United States is—

1. A wheel for vehicles, composed of a hub, a rim, and spokes, formed of tubes, and washers interposed between said spokes and rim, said spokes being shorter than the distance between the hub and said rim, said washers filling the space between said rim and spokes, said spokes firmly secured in position by means of screws entering from the outside of said rim, and the chambered portion of said washers causing said washers to yield and spring, thus preventing the screws from becoming detached for the purpose as specified.

2. A wheel for vehicles, composed of tubular spokes and plugs therein, screw-threads formed on said spokes and plugs of a different pitch, or differential, in combination with a wheel-rim provided with holes or perforations, washers interposed between said spokes and rim, nibs or teats on said washers for engaging the perforations in said rim and holding said washers in place, as shown and described.

3. A wheel for automobiles composed of metallic spokes, a hub, screw-threads on said spokes and secured in said hub, in combination with a wheel-rim having washers interposed between said spokes and rim, of countersunk openings formed on the under side of said washers for engaging the chamfered ends of said spokes for the purpose as shown and described.

4. A wheel for vehicles composed of tubular spokes, a hub and rim, screw-threads on the opposite ends of said spokes for engaging said hub and rim, holes or perforations in said rim, in combination with washers having nibs or teats thereon for engagement with the holes in said rim, for the purpose as specified.

5. A metallic wheel for automobiles composed of tubular spokes, a hub and rim, said spokes secured in said hub by means of differential screws thereon, the opposite ends of said spokes secured to screw-threaded washers on the under side thereof, and secured by bolts to said rim as shown and described.

In testimony whereof I affix my signature in presence of two witnesses.

EMMETT McCONVILLE.

Witnesses:
W. REES EDELEN,
REEVE LEWIS.